(12) United States Patent
Sadi-Haddad et al.

(10) Patent No.: US 12,165,490 B2
(45) Date of Patent: Dec. 10, 2024

(54) TRANSMISSION BELT

(71) Applicants: SKF Magnetic Mechatronics, Saint-Marcel (FR); Aktiebolaget SKF, Gothenburg (SE)

(72) Inventors: Lakdar Sadi-Haddad, Nogent sur Marne (FR); Lloyd Brown, Singapore (SG); David Beggs, Antipolo (PH)

(73) Assignees: SKF Magnetic Mechatronics, Saint-Marcel (FR); Aktiebolaget SKF, Gothenburg (SE)

( * ) Notice: Subject to any disclaimer, the term of this patent is extended or adjusted under 35 U.S.C. 154(b) by 9 days.

(21) Appl. No.: 17/947,583

(22) Filed: Sep. 19, 2022

(65) Prior Publication Data
US 2023/0115742 A1 Apr. 13, 2023

(30) Foreign Application Priority Data
Oct. 7, 2021 (DE) .......................... 102021211347.8

(51) Int. Cl.
*G08B 21/18* (2006.01)
*F16G 1/06* (2006.01)
(Continued)

(52) U.S. Cl.
CPC .............. *G08B 21/187* (2013.01); *G01B 7/16* (2013.01); *G01M 13/023* (2013.01); *G08B 21/182* (2013.01); *F16G 1/06* (2013.01)

(58) Field of Classification Search
CPC ....... G01M 13/023; G08B 21/182; F16G 1/06
See application file for complete search history.

(56) References Cited

U.S. PATENT DOCUMENTS

| 4,268,573 A | * | 5/1981 | Baillievier | ............... D07B 3/02 57/902 |
| 6,825,758 B1 | * | 11/2004 | Laitsaari | ............. B60C 23/0408 340/447 |

(Continued)

FOREIGN PATENT DOCUMENTS

| JP | 2020006930 A | 1/2020 |
| JP | 6741889 B2 | 8/2020 |

(Continued)

OTHER PUBLICATIONS

2019 IEEE SmartWorld, Ubiquitous Inteligence & Computing, Advanced & Trusted Computing, Scalable Computing & Communications, Cloud & Big Data Computing, Internet of People and Smart City Innovation Passive Embroidered Stretch Sensor Utilizing UHF RFID Antennas Mengxia Yu1, Silong Wang 2, Yulong Liu3, Lulu Xu4, Terry Tao Ye5?.

(Continued)

*Primary Examiner* — John A Tweel, Jr.
(74) *Attorney, Agent, or Firm* — GARCIA-ZAMOR INTELLECTUAL PROPERTY LAW, LLC; Ruy Garcia-Zamor

(57) ABSTRACT

The present invention relates to a transmission belt providing a belt member, and at least one RFID tag attached to the belt member, the at least one RFID tag including an integrated circuit, and an antenna connected to the integrated circuit for transmitting a signal indicative of a state of the transmission belt. The signal indicative of the state of the transmission belt is determined on the basis of a current deflection of the antenna.

8 Claims, 6 Drawing Sheets

(51) Int. Cl.
  *G01B 7/16*   (2006.01)
  *G01M 13/023*  (2019.01)

(56) References Cited

U.S. PATENT DOCUMENTS

| | | | | |
|---|---|---|---|---|
| 10,408,344 | B2* | 9/2019 | Ma | F16H 37/021 |
| 2003/0080918 | A1* | 5/2003 | Forster | G06K 19/07786 |
| | | | | 343/895 |
| 2022/0128120 | A1* | 4/2022 | Hayashi | G06K 19/0723 |

FOREIGN PATENT DOCUMENTS

| | | |
|---|---|---|
| JP | 2020118297 A | 8/2020 |
| WO | 2020158696 A1 | 8/2020 |

OTHER PUBLICATIONS

Wearable Textile UHF-RFID Sensors: A Systematic Review Chengyang Luo , Ignacio Gil and Raúl Fernández-Garcia Department of Electronic Engineering, Universitat Politecnica de Catalunya, 08222 Barcelona, Spain; chengyang.luo@upc.edu (C.L.); ignasi.gil@upc.edu (I.G.).

* cited by examiner

TRANSMISSION BELT

CROSS-REFERENCE TO RELATED APPLICATIONS

This application claims priority to German Patent Application no. 102021211347.8, filed Oct. 7, 2021, the contents of which is fully incorporated herein by reference.

TECHNICAL FIELD

The present invention concerns a transmission belt which to at least some extent overcomes the some of the issues with prior art. The present invention also concerns a condition monitoring arrangement for monitoring a state of a transmission belt. The present invention also concerns a method for issuing a signal indicative of a state of a transmission belt. The present invention also concerns a method for condition monitoring a transmission belt.

BACKGROUND OF THE INVENTION

Transmission belts are well-known components to transmit power between two rotatable shafts in a machinery. Poor tension can quickly damage or destroy the belt by overheating caused by slippage (too low tension) or damage bearings supporting the rotatable shafts due to overload applied to the shafts (too high tension). To ensure trouble-free operation and to benefit from all the properties of a transmission belt, special attention is paid on the initial installation. Once the belt is in operation, the belts are normally no longer monitored although they deteriorate over time. Based on for instance environmental conditions and other factors such as how the machinery is operated, the belt can deteriorate faster than expected, which will deteriorate the efficiency and potentially cause irreversible damage to the system. A way of monitoring the condition of the belt after initial installation is to provide the transmission belt with sensors for sensing and collecting data regarding a condition of the transmission belt, and batteries to power the sensors. The data can then be read and analyzed. However, adding batteries and sensors complicate the manufacturing and add weight to the belt. Further, the manufacturing may be stalled based on availability of a particular sensor. Also, sensors tend to break, and batteries run out of power, thereby hindering the collection of data regarding the condition of the belt.

SUMMARY OF THE INVENTION

In view of the above, a first object of the invention is to provide an improved transmission belt which to at least some extent overcomes at least some of the issues with prior art. A further object of the invention is to provide an improved condition monitoring arrangement for monitoring a state of a transmission belt. A yet further object is to provide a method for issuing a signal indicative of a state of a transmission belt. A yet further object is to provide an improved method for condition monitoring a transmission belt.

According to a first aspect of the invention, the first object is achieved by a transmission belt comprising the technical features recited in claim 1. Thus, a transmission belt is provided. The transmission belt comprises:

a belt member, and
at least one RFID tag attached to the belt member. The at least one RFID tag comprises:
an integrated circuit, and
an antenna connected to the integrated circuit for transmitting a signal indicative of a state of the transmission belt,
wherein the signal indicative of the state of the transmission belt is determined on the basis of a current deflection of the antenna.

By provision of the transmission belt as disclosed herein, an improved transmission belt is provided, for which a signal indicative of a state of the transmission belt is determined on the basis of a current deflection of the antenna. In particular, it has been realized that by using a current deflection of the antenna to determine a state of the belt, a separate sensor member for sensing a state of the belt does not need to be integrated into the belt. Thereby, as fewer components are needed, and a more robust and reliable transmission belt is achieved in a cost-effective manner. Furthermore, a simplified and cost-effective production of the belt is achieved.

The present invention also provides a better performing transmission belt, as less components are needed to integrate onto or into the belt, potentially weakening the structure of the belt. Furthermore, as less weight is added to a spot of the belt to provide for the sensing and transmitting functionality, the belt is less sensitive to becoming unbalanced, thereby providing for a better functioning transmission belt. Consequently, the machinery in which the transmission belt is applied is naturally also better operated. This is especially the case for applications with high rotating speed.

By "RFID tag" as used herein is meant a Radio Frequency Identification (RFID) tag. RFID tags may often comprise an antenna and an integrated circuit chip (IC), such as a radio frequency integrated circuit chip (RFIC).

By "a state" of the transmission belt as used herein is meant any physical parameter possible to measure by interpreting the current fluctuation of the antenna. These physical parameters may be, but is not limited to, for instance force, temperature, strain, acceleration, elongation, pressure and/or humidity. These parameters are all relevant to either monitor the condition of the belt, or the environment in which the belt is operating. The parameters may also be used to monitor how the machinery in which the belt inserted in is operated. These are all things that ultimately affects the condition and service life of the transmission belt.

The belt may at least partly be made from rubber. It may also be made from any other suitable material, or any combinations of suitable materials for providing the right characteristics of the belt in question. The combination of materials may be for instance having metal wires to provide strength, and/or having parts made from fabric or textiles. The belt may comprise any other material or combination of suitable materials.

The RFID tag may be attached to the transmission belt by for instance gluing the RFID tag to the transmission belt. It may also be moulded into a portion made from rubber. The RFID tag may also be attached to an intermediate attachment member for being attached to the belt to provide for a more firm and rigid attachment to the transmission belt.

The antenna will be further explained and exemplified below as a wire having a length and a thickness. The antenna wire is longer than it is thick. The wire is extending lengthwise as referred to as a "lengthwise direction", and having a thickness measured in a radial direction, the radial direction being perpendicular to the lengthwise direction. A cross section of the antenna should be understood as the profile of the wire in a plane extending in a radial direction perpendicular to the lengthwise direction. Although the antenna is described as a wire, it should be understood that the antenna may have any other suitable configuration and composition suitable for transmitting signals from the transmission belt, such as in the shape of a printed circuit.

By "a current deflection" of the antenna as used herein is meant any present shape of the antenna. The deflection may be a normative deflection, i.e., a shape corresponding to an expected shape as when the transmission belt is installed and/or operated. The current deflection may also be for instance in a lengthwise compressed or elongated deflection compared with the normative deflection, in which case it may indicate an elongation, acceleration, force and/or strain in the transmission belt. The current deflection may also be in a radially expanded or radially compressed shape, such that the area of a cross section of the wire is increased or decreased. This may indicate a temperature increase or decrease of the transmission belt. As the antenna element is stretched or compressed in different ways, the signal it transmits will have different frequencies and wavelengths corresponding to different states. These signals with different frequencies and wavelengths can then be picked up by a receiver and compared with a predetermined signal set. Thereby, the current signal indicative of a state of the belt can be compared and reveal what state the transmission belt is in, such as if it is in an elongated state.

By "signal" as used herein is meant any of a radio frequency wave, electromagnetic wave or any other suitable technology for transmitting information regarding a state of a belt.

Optionally, the state is a state of elongation of the transmission belt. As the belt is elongated, so will the antenna that is attached to the belt member. As such, the antenna will generate a different signal corresponding the elongation of the antenna and the belt.

Optionally, the at least one RFID tag is configured to transmit the signal while the transmission belt is in operation. A benefit of transmitting the signal while the transmission belt is in operation is that the signal can be received and read without stopping the machinery. Thereby, an increased operation efficiency of the machinery can be achieved.

Optionally, the at least one RFID tag is a passive RFID tag. Passive RFID tags do not use batteries to power them. Instead, passive RFID tags may use high-power readers that may send out for example a low-frequency, high-power radio frequency signal or an electromagnetic wave to the RFID-tag to power it. Once the reader transmits the radio frequency signal or electromagnetic wave to the tag, a magnetic field is generated, and electric energy may be generated in the antenna. The integrated circuit connected to the antenna then uses the power generated to operate. For instance, the integrated circuit may use the power to transmit a signal or any other type of data. It may also use the generated power to store signals and/or data. So, the antenna in the passive RFID tag generates power based on the reader signals and/or waves sent with a frequency to generate power which wakes up its integrated circuit. The RFID tag may then transmit a signal back to the reader at a different frequency. As such, the passive RFID does not require a battery, further simplifying the construction and reducing the weight of the belt. Furthermore, the belt does not require battery replacements.

Optionally, the transmission belt further comprises a Bluetooth transmitter and the antenna and configured to transmit at least part of the signal wirelessly, and a battery configured to power the Bluetooth transmitter, and optionally configured to power the at least one RFID tag. The optional RFID tag being powered by the battery would be an active RFID tag. A benefit of having a Bluetooth transmitter powered by a battery is that the signal can be sent and read at further distance from the belt compared to the case where the RFID tag is a passive RFID tag. Also, the configuration of a condition monitoring arrangement comprising a reader of the signal can be made more freely such that the reader can be placed further away from the transmission belt compared to a passive RFID tag or other wireless transmitters.

Optionally, the Bluetooth transmitter is connected to the antenna.

Optionally, the transmission belt has both active and passive RFID tags. As such, the transmitting of a signal indicative of a state of the transmission belt can be made in a more reliable way. The active RFID tag may be configured to transmit the signal when the passive RFID tag does not manage to be powered by a reader or otherwise failing to transmit the signal. This could for instance be due to a displacement of the reader after some usage of a machinery or vehicle in which it is installed. Similarly, the passive RFID tag may be configured to transmit the signal when the active RFID tag is failing to transmit the signal, for instance due to that the battery is empty. Further optionally, the transmission belt may have both active and passive RFID tags transmitting simultaneously to a respective reader to ensure reliable reading of the signal in case any of the respective transmission of a signal would malfunction in any way. A benefit of having at least two transmissions of the signal is that the two signals can be compared, and any deviations may signal that something is wrong or about to go wrong with the belt and its components. As such, by having both active and passive RFID tags, a more reliable transmission belt is obtained.

The present invention also relates to a condition monitoring arrangement for monitoring a state of a transmission belt. The arrangement comprises a transmission belt according to any one of embodiments of the transmission belt, wherein the arrangement further comprises at least one receiver for receiving the signal transmitted from the transmission belt.

Optionally, the receiver is an RFID reader. Still optionally, the receiver is an RFID reader that also powers the RFID tag by sending out electromagnetic waves. Once the reader transmits electromagnetic waves to the tag, the antenna inside the transmission belt creates a magnetic field, and electric energy is generated in the antenna. The integrated circuit connected to the antenna then uses the power generated to transmit data back to the reader. A benefit of having a reader transmitting energy to the RFID tag is that the transmission belt does not require battery to transmit the signal.

Still optionally, the condition monitoring arrangement comprises a receiver for receiving signal transmitted from a Bluetooth transmitter. Further optionally, the condition monitoring arrangement comprises both a RFID reader and a Bluetooth receiver.

Optionally, the condition monitoring arrangement may comprise a plurality of transmission belts. Each one of the plurality of belts may be different according to any of the embodiments as disclosed herein, or the belts may be of the same type according to any of the embodiments as disclosed herein.

The present invention also relates to a method for issuing a signal indicative of the state of a transmission belt. The belt comprises:

a belt member, and at least one RFID tag attached to the belt member.
   Wherein the at least one RFID tag comprises
an integrated circuit, and
an antenna connected to the integrated circuit for transmitting a signal indicative of a state of the transmission belt. The method comprises:
determining a state on a basis of a current deflection of the antenna, and
issuing the signal.

The present invention also relates to a method for condition monitoring a transmission belt issuing a signal according to an embodiment as disclosed herein. The method comprises:
receiving the signal by using a receiver,
comparing the signal with a predetermined signal set.
Optionally, the receiver is a RFID reader.
Still optionally, the method for condition monitoring a transmission belt further comprises:
notifying an operator if the signal is outside a predetermined signal set.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The present invention will hereinafter be further explained by means of non-limiting examples with reference to the appended schematic figures where.

It should be noted that the drawings have not necessarily been drawn to scale and that the dimensions of certain features may have been exaggerated for the sake of clarity.

DETAILED DESCRIPTION OF EMBODIMENTS

Figure 1A:
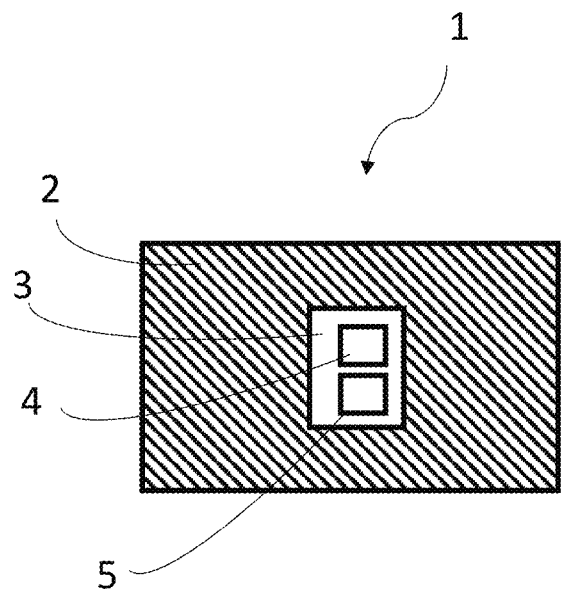
FIG. 1a is a schematic view of a transmission belt according to an example embodiment of the present invention.

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. FIG. 1a depicts a schematic view of a transmission belt 1 according to an example embodiment of the present invention. The transmission belt 1 comprises a belt member 2, and at least one RFID tag 3 attached to the belt member 2. The at least one RFID tag 3 comprises an integrated circuit 5, and an antenna 4 connected to the integrated circuit 5 for transmitting a signal indicative of a state of the transmission belt 1. The signal indicative of the state of the transmission belt 1 is determined on the basis of a current deflection of the antenna 4.

Figure 1B:
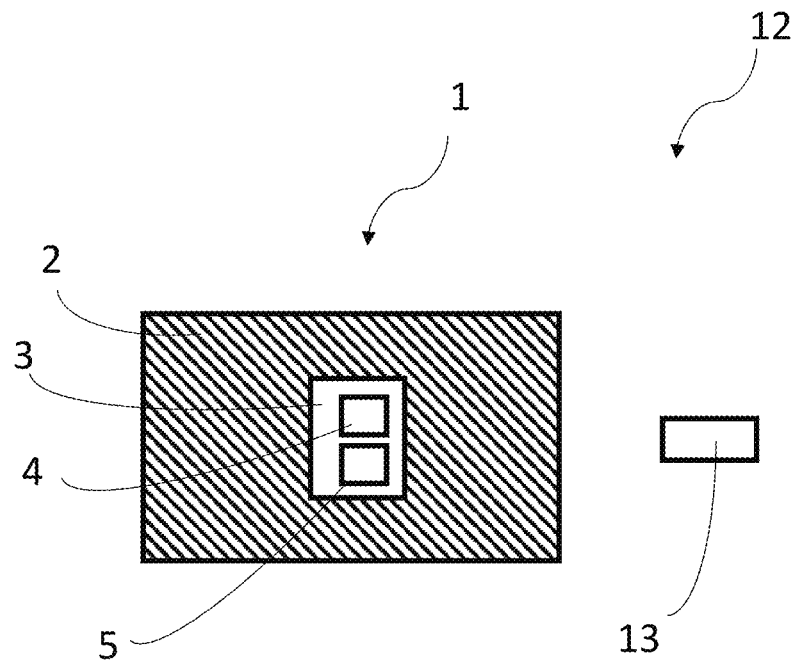
FIG. 1b is a schematic view of a transmission belt and a condition monitoring arrangement according to an example embodiment of the present invention.

FIG. 1b depicts a schematic view of a transmission belt 1 and a condition monitoring arrangement 12 according to an example embodiment of the present invention. Here, the transmission belt from FIG. 1a is shown in combination with a receiver 13 for receiving a transmitted signal indicative of a state of the transmission belt 1. The transmission of the signal may be done by a physical connection or wirelessly.

Figure 2:
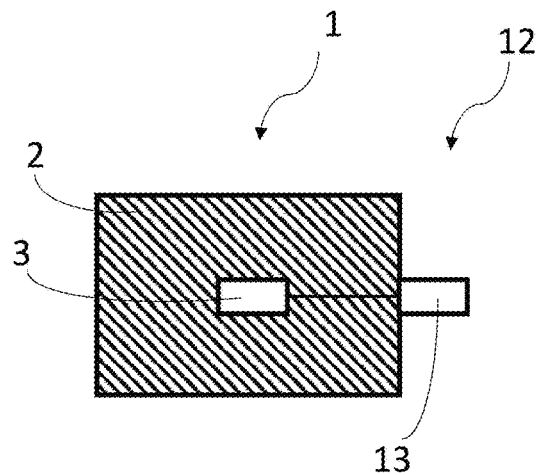
FIG. 2 is a schematic view of a transmission belt and a condition monitoring arrangement according to an example embodiment of the present invention.

FIG. 2 depicts a schematic view of a transmission belt 1 and a condition monitoring arrangement 12 according to an example embodiment of the present invention. Here, the receiver 13 is connecting to the RFID-tag 3 in a physical manner to transfer the signal or any other data. For example, a wire from the receiver 13 may be connected to a socket of the transmission belt 1 with an electrical connection to the RFID tag 3. Such electrical connection to receive a signal indicative of a state of the transmission belt 1 physically may be done in any other suitable way.

Figure 3:
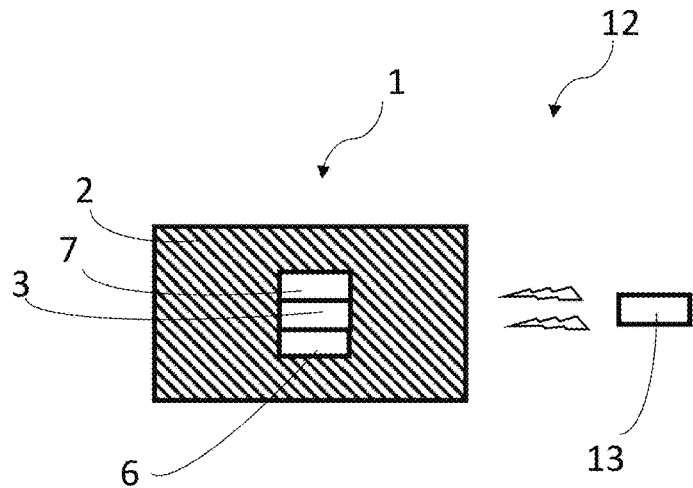
FIG. 3 is a schematic view of a transmission belt and a condition monitoring arrangement according to an example embodiment of the present invention.

FIG. 3 depicts a schematic view of a transmission belt 1 and a condition monitoring arrangement 12 according to an example embodiment of the present invention. Here, the transmission belt 1 can be seen further comprising a Bluetooth transmitter 6 configured to transmit at least part of the signal wirelessly, and a battery 7 configured to power the Bluetooth transmitter 6, and optionally configured to power the at least one RFID tag 3.

Figure 4:
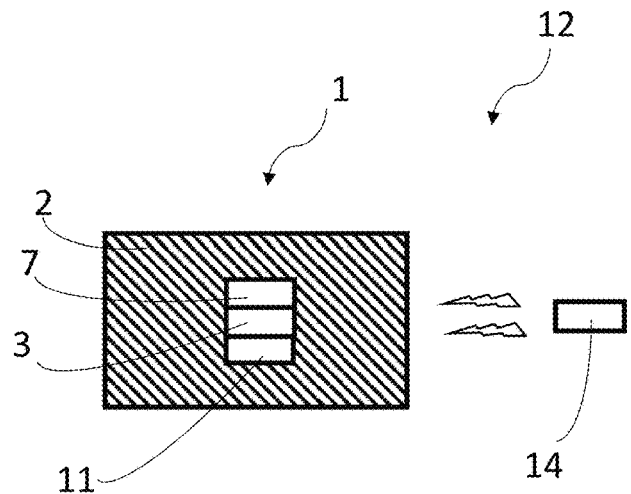
FIG. 4 is a schematic view of a transmission belt and a condition monitoring arrangement according to an example embodiment of the present invention.

FIG. 4 depicts a schematic view of a transmission belt 1 and a condition monitoring arrangement 12 according to an example embodiment of the present invention. Here, the condition monitoring arrangement 12 can be seen having, in addition to an RFID tag 3, an active RFID tag 11 and a battery 7 to power the active RFID tag 11. Further, the condition monitoring arrangement 12 has an RFID reader 14 to receive the signal, but it could also be a normal receiver. In an embodiment, the RFID tag 3 is a passive RFID tag 10, and the RFID reader 14 is used to power the passive RFID tag 10.

Figure 5:
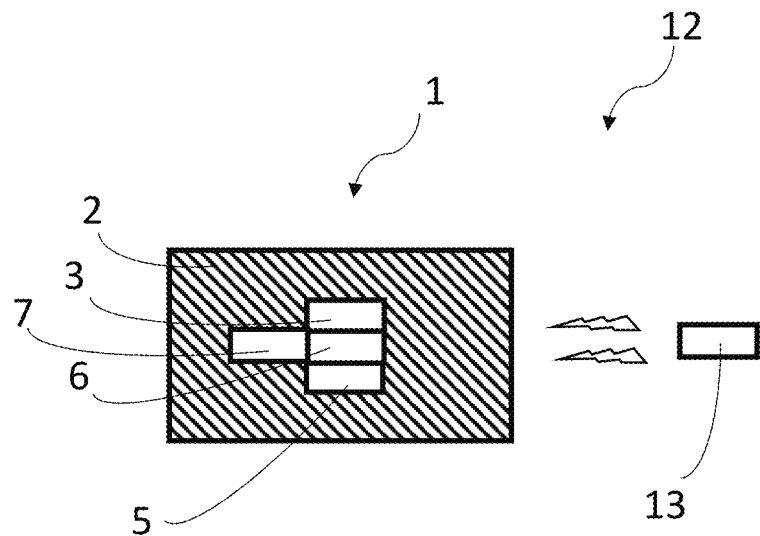
FIG. 5 is a schematic view of a transmission belt and a condition monitoring arrangement according to an example embodiment of the present invention.

By active RFID tag is meant a RFID tag powered by a battery. By passive RFID tag is meant a RFID tag FIG. 5 depicts a schematic view of a transmission belt 1 and a condition monitoring arrangement 12 according to an example embodiment of the present invention. Here, the transmission belt 1 of FIG. 2 can be seen complemented with a separate integrated circuit 5. The integrated circuit 5 may be used for storing signal data in case the signal would not be able to be transmitted and/or received at some point. Then the signal and its related data may be stored and transmitted later upon a successful connection between the RFID tag 3 and the receiver 13.

Figure 6:
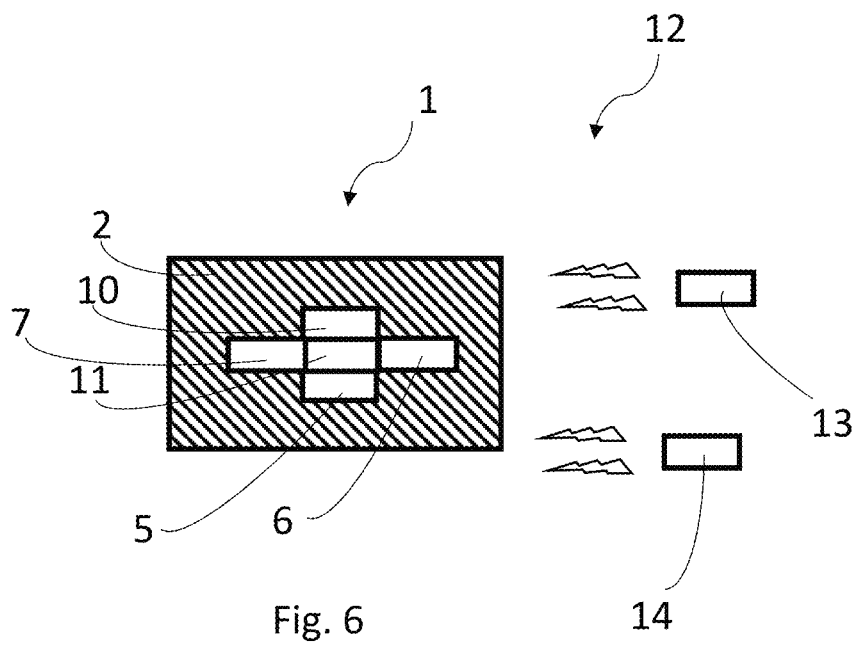
FIG. 6 is a schematic view of a transmission belt and a condition monitoring arrangement according to an example embodiment of the present invention.

FIG. 6 depicts a schematic view of a transmission belt 1 and a condition monitoring arrangement 12 according to an example embodiment of the present invention. Here, the transmission belt 1 can be seen comprising an active RFID tag 11, a passive RFID tag 10, an integrated circuit 5 similarly to the transmission belt 1 as explained for FIG. 5, a Bluetooth transmitter 6 and battery 7 to power at least the active RFID tag 11 and the Bluetooth transmitter 6. Further, the use of both a receiver 13 and a RFID reader 14 can be seen for receiving the signal indicative of the state of the transmission belt 1 as well as using the RFID reader 14 for powering the passive RFID tag 10.

Figure 7:
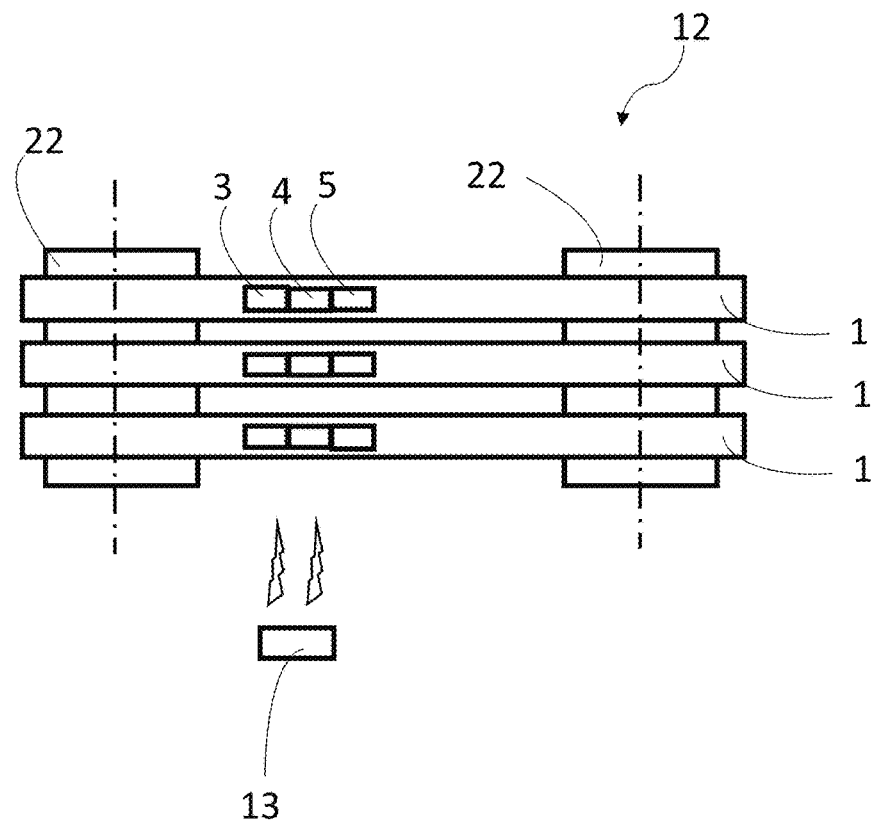
FIG. 7 is a schematic view of a condition monitoring arrangement according to an example embodiment of the present invention.

FIG. 7 depicts a schematic view of a condition monitoring arrangement 12 according to an example embodiment of the present invention. The condition monitoring arrangement 12 for monitoring a state of a transmission belt 1 comprises a transmission belt 1 according to any one of the embodiments as presented in the present disclosure. Here, a multi-belt application can be seen comprising a plurality of transmission belts 1 according to an embodiment of the present invention running over two pulleys 22. One of the pulleys may be a drive pulley connected to an engine or motor, and the other pulley may be a driven pulley connected to a vehicle or machinery. The arrangement 12 is further seen comprising at least one receiver 13 for receiving a signal transmitted from the transmission belt 1.

Figure 8:
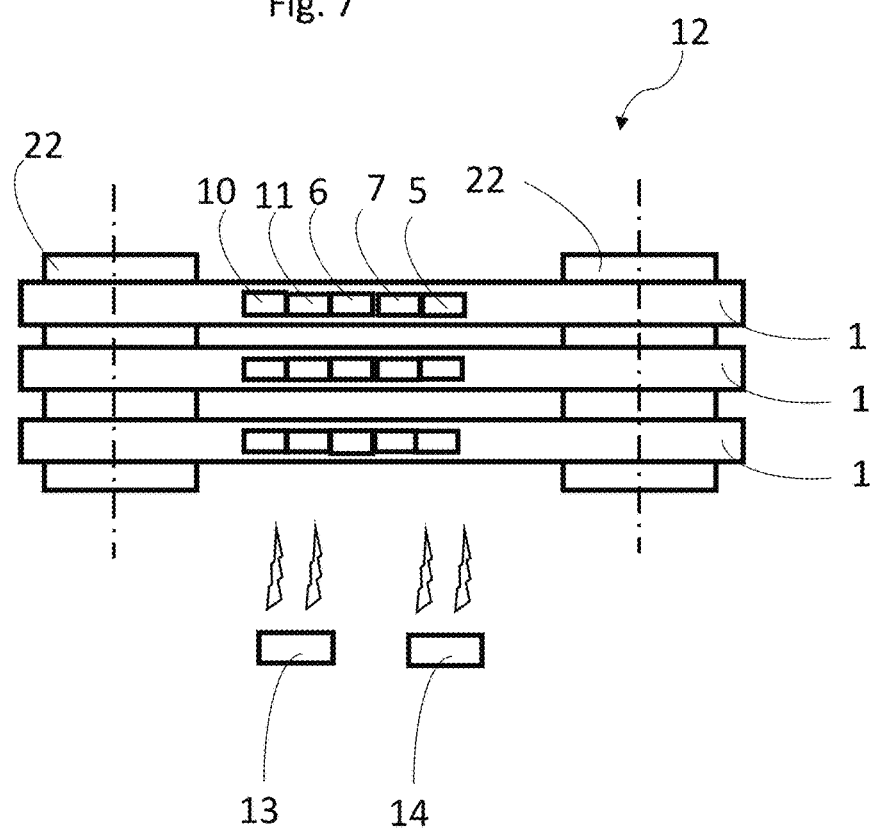
FIG. 8 is a schematic view of a condition monitoring arrangement according to an example embodiment of the present invention.

FIG. 8 depicts a schematic view of a condition monitoring arrangement 12 according to an example embodiment of the present invention. Here, a multi-belt application can be seen, similar to FIG. 7, here comprising the condition monitoring arrangement 12 of FIG. 6.

Figure 9:
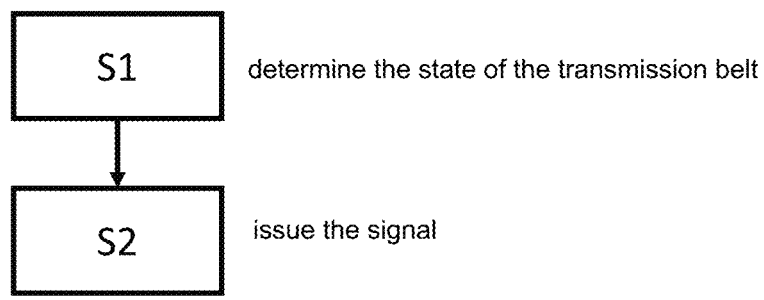
FIG. 9 is a flowchart of a method according to an example embodiment of the present invention.

FIG. 9 depicts a flowchart of a method according to an example embodiment of the present invention.

The method is a method for issuing S2 a signal indicative of the state of a transmission belt 1. The belt 1 (not shown) comprises a belt member 2, and at least one RFID tag 3 attached to the belt member 2. The at least one RFID tag 3 comprises an integrated circuit 5, and an antenna 4 connected to the integrated circuit 5 for transmitting a signal indicative of a state of the transmission belt 1 (not shown). The method comprises determining S1 the state of the transmission belt 1 on the basis of a current deflection of the antenna 4 and issuing S2 the signal.

Figure 10:
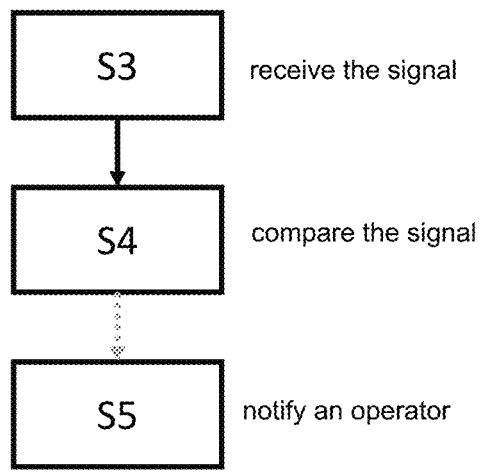
FIG. 10 is a flowchart of a method according to an example embodiment of the present invention.

FIG. 10 depicts a flowchart of a method according to an example embodiment of the present invention. The method is a method for condition monitoring a transmission belt 1 issuing S2 a signal as described in FIG. 9. The method comprises receiving S3 the signal by using a receiver 13 (not shown) and comparing S4 the signal with a predetermined signal set. By comparing the signal with a predetermined signal set, a state of the transmission belt 1 can be determined. For instance, a state of elongation of the transmission belt 1 may be determined.

The flowchart of the method can be seen comprising a further optional step of notifying S5 an operator if the signal is outside a predetermined signal set. This way, the operator can analyse the situation and take suitable actions to maintain an efficient operation of the machinery, such as planning for servicing or replacing the transmission belt 1.

Figure 11:
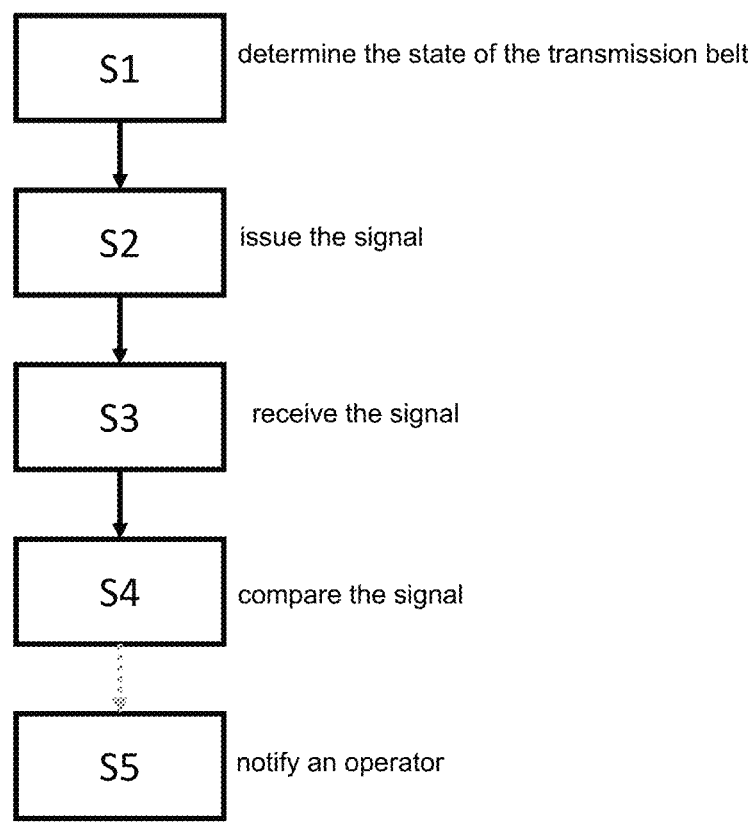
FIG. 11 is a flowchart of a method according to an example embodiment of the present invention.

FIG. 11 depicts a flowchart of a method according to an example embodiment of the present invention. Here, a combination of the methods for issuing a signal as shown in FIG. 9 and for condition monitoring a transmission belt 1 as shown in FIG. 10 can be seen.

It is to be understood that the present invention is not limited to the embodiments described above and illustrated in the drawings; rather, the skilled person will recognize that many changes and modifications may be made within the scope of the appended claims.

The invention claimed is:

1. A transmission belt comprising:
    a belt member, and
    a first RFID tag and a second RFID tag attached to the belt member, each of the first and second RFID tags comprising:
        an integrated circuit, and
        an antenna connected to the integrated circuit for transmitting a signal indicative of a state of the transmission belt, wherein
        the signal indicative of the state of the transmission belt is determined on the basis of a current deflection of the antenna,
    wherein the first RFID tag is a passive RFID tag and the second RFID tag is an active RFID tag, and
    wherein the belt is made from rubber and metal wires to provide strength.

2. The transmission belt according to claim 1, wherein the state is a state of elongation of the transmission belt.

3. The transmission belt according to claim 1, wherein first and second RFID tags are configured to transmit the signal while the transmission belt is in operation.

4. The transmission belt according to claim 1, wherein the transmission belt further comprises a Bluetooth transmitter configured to transmit at least part of the signal wirelessly, and a battery configured to power the Bluetooth transmitter, and optionally configured to power the first and second RFID tags.

5. A condition monitoring arrangement for monitoring a state of a transmission belt, the arrangement comprising:
    a transmission belt having a belt member, and a first RFID tag and a second RFID tag attached to the belt member, each of the first and second RFID tags comprising:
        an integrated circuit, and
        an antenna connected to the integrated circuit for transmitting a signal indicative of a state of the transmission belt,
    wherein the first RFID tag is a passive RFID tag and the second RFID tag is an active RFID tag, wherein the belt is made from rubber and metal wires to provide strength, wherein the signal indicative of the state of the transmission belt is determined on the basis of a current deflection of the antenna, wherein the arrangement further comprises at least one receiver for receiving the signal transmitted from the transmission belt.

6. A method for issuing a signal indicative of the state of a transmission belt, wherein the belt is made from rubber and metal wires to provide strength, the belt providing a belt member, and a first RFID tag and a second FRID tag attached to the belt member, the first and second RFID tags including an integrated circuit, and an antenna connected to the integrated circuit for transmitting a signal indicative of a state of the transmission belt, the first RFID tag being a passive RFID tag and the second RFID tag being an active RFID tag, the method comprising:

determining the state of the transmission belt on the basis of a current deflection of the antenna, and issuing the signal.

7. The method for condition monitoring a transmission belt issuing a signal according to claim 6, the method comprising:

receiving the signal by using a receiver, and comparing the signal with a predetermined signal set.

8. The method for condition monitoring a transmission belt according to claim 7, further comprising:

notifying an operator if the signal is outside a predetermined signal set.

\* \* \* \* \*